(No Model.)
W. H. SILVERTHORN.
CAR WHEEL.
No. 448,683. Patented Mar. 24, 1891.
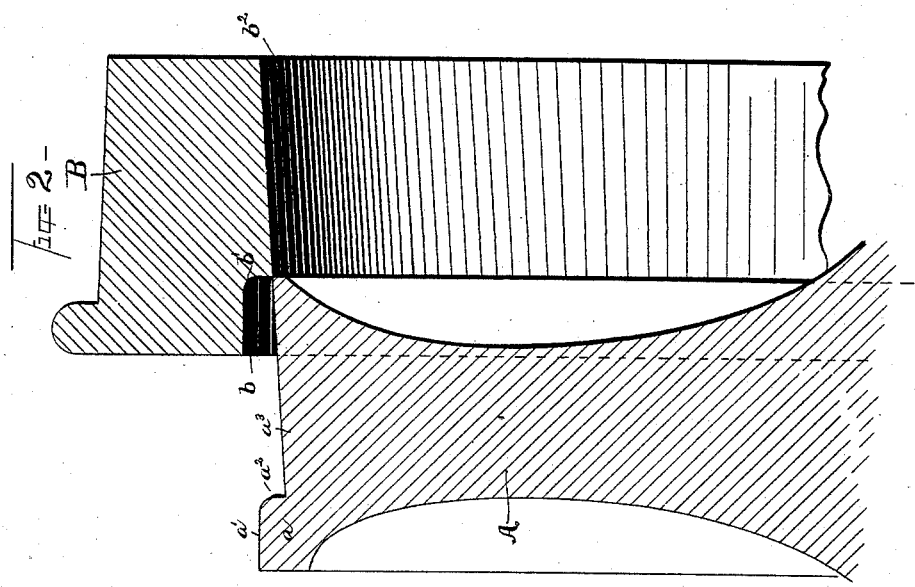
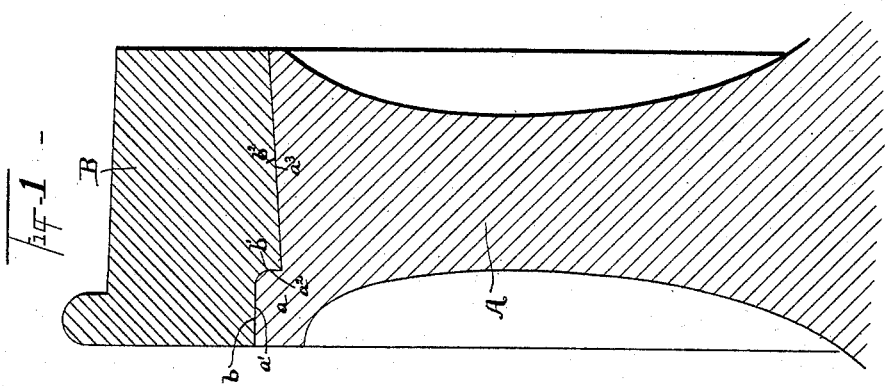
WITNESSES:
N. H. Fay
Wm H Lechner
INVENTOR
William H. Silverthorn,
BY
Hall & Fay
his ATTORNEYS.

UNITED STATES PATENT OFFICE.

WILLIAM H. SILVERTHORN, OF CLEVELAND, OHIO.

CAR-WHEEL.

SPECIFICATION forming part of Letters Patent No. 448,683, dated March 24, 1891.

Application filed November 24, 1890. Serial No. 372,427. (No model.)

*To all whom it may concern:*

Be it known that I, WILLIAM H. SILVERTHORN, a citizen of the United States, and a resident of Cleveland, county of Cuyahoga, and State of Ohio, have invented certain new and useful Improvements in Car-Wheels, of which the following is a specification, the principle of the invention being herein explained and the best mode in which I have contemplated applying that principle so as to distinguish it from other inventions.

In car-wheels, and more especially in wheels used for electric-motor street-cars, it is very desirable to employ removable steel tires, which may be removed from and applied to the wheels without requiring to be sent to a car-wheel factory, and which may be removed from and applied to the wheels at the depot or repair-shops of the railway without requiring a large plant of repair machinery and furnaces and without too large an expenditure of time and labor. The wheels with renewable tires which have heretofore been in most general use have been wheels either with solid or cast-metal centers or with plate centers. The peripheries of the solid centers have usually recesses, steps, or shoulders, into and against which the correspondingly-shaped inner peripheries of the tires fit. Said tires are usually heated to black heat and then shrunk upon the centers, whereupon flanges are placed over the joined edges upon the sides of the wheels from which the tires have been slipped upon the centers, and the parts are at last secured by bolts passing through the intersecting portions of the joined surfaces. Wheels having centers made up from plates have said plates made of such diameters that they will fit into the grooves, recesses, or shoulders of the inner peripheries of the tires. The plate centers are then radially expanded by axial compression derived from hydraulic or other powerful presses, and the intersecting joined surfaces are secured together by bolts. In both forms of wheel it is necessary to remove the fastening-bolts by drilling or other process when the tire is to be removed and to drill holes for the insertion of the bolts, which process requires either the wheel to be sent to a car-wheel factory or the existence of a large and expensive plant for the repair and retiring of wheels, especially for wheels having plate centers. The bolts are also liable to work loose in the above forms of wheels and to thus endanger the safety of the wheels, and in severely hot weather the tires are liable to expand and become loose on account of their having been attached either slightly heated or cold.

The objects of my invention are to provide a wheel having a solid center with a steel tire secured simply by shrinking without bolts or other fasteners and to provide the joining-surfaces of the center and tire of such a wheel with suitable grooves and projections for firmly holding the tire in place.

Referring to the drawings, Figure 1 represents an axial section of a portion of my improved car-wheel, and Fig. 2 an axial section illustrating the tire in the act of being placed upon the center.

In said drawings, the letter A indicates the center, and B the tire, of the wheel. Said center is preferably cast or forged in one piece, solid or with spokes, and the periphery of said center is formed with an annular rib, flange, or shoulder portion $a$, having a straight outer face $a'$ parallel to the axis of the wheel and an annular shoulder $a^2$ at right angles to said face, said face and annular shoulder having a rounded corner. The remaining portion of the periphery is an inwardly-inclined face $a^3$, and a shallow groove $a^2\ a^3$ is thus formed, the outer edge of which is slightly below the plane of the straight face $a'$. The inner periphery of the tire is formed to exactly correspond in shape to the shape of the periphery of the center, having a straight portion $b$, a shoulder $b'$ at right angles to said straight portion, and an inclined portion $b^2$, said shoulder and inclined portion forming a rib $b'\ b^2$, which fits into the groove $a^2\ a^3$, and said straight portion $b$ and shoulder $b'$ forming an annular recess to fit upon the rib $a$.

When the tire is to be secured upon the center, it is heated to red heat, which will expand said tire just sufficient to allow the ridge of the rib $b'\ b^2$ to pass over the outer edge of the shallow groove $a^2\ a^3$, as clearly illustrated in Fig. 2 of the drawings, and when the tire cools upon the center it will contract sufficiently to firmly bind it upon the center in such a manner that there will be no danger of the tire coming loose by expansion from exposure to heat or by rough usage.

The application of the tire to the center will not require a large plant or much labor, a furnace or forge sufficiently large to accommodate a tire and suitable means for handling the same being all that is required.

In this wheel no bolts are required, and consequently the trouble of bolts working loose, as well as the labor required in drilling bolt-holes, will be avoided. The two facing shoulders will bear the inward thrust upon the wheel, and the tendency of the wheel when in use will be to force the tire in upon its seat in the periphery of the center, said tendency being assisted and increased by the inward inclination of the groove in said periphery.

Wheels of this construction may thus be easier retired and will be less liable to have the tires work loose than wheels in which bolts are employed.

If desired, the annular rib may be formed at the outer face of the wheel and the inclined face extend from the inner face, and the incline of said face may be varied according to whatever incline may be found desirable. The height of the annular rib will change according to the incline of the face. The proportionate widths of the annular rib and the inclined face may be changed, the rib may be wider and the inclined face narrower, or vice versa.

The foregoing description and accompanying drawings set forth in detail mechanism embodying my invention. Change may be made therein, provided the principles of construction respectively recited in the following claims are employed.

I therefore particularly point out and distinctly claim as my invention—

1. A car-wheel center formed with an annular groove in its periphery, having one side inclined toward the center of the wheel and having one abutting side, substantially as set forth.

2. A car-wheel center formed in its periphery with an annular groove having one side inclined toward the center and one side at a right angle to the axial line of the wheel, substantially as set forth.

3. A car-wheel center formed upon its periphery with an annular rib or flange at a right angle to the plane of the wheel and a face inclined toward the center, the shoulder of said rib or flange and said inclined face forming a groove, substantially as set forth.

4. A car-wheel tire formed with an annular rib upon its inner periphery, having one face inclined toward the center and having one abutting-face, substantially as set forth.

5. A car-wheel tire formed upon its inner periphery with an annular rib having a face inclined toward the center and an annular face at a right angle to the axial line of the tire, substantially as set forth.

6. A car-wheel tire formed in and upon its inner periphery with a right-angled annular recess and a face inclined toward the center of the wheel, substantially as set forth.

7. The combination, with a car-wheel center formed with a peripheral groove having one inclined and one abutting side, of a tire formed with an annular rib having one inclined and one abutting face upon its inner periphery, and secured upon said center by shrinking, substantially as set forth.

8. The combination, with a car-wheel center formed with a peripheral groove having one side inclined toward the center of the wheel and one side at a right angle to the axial line of the wheel, of a tire formed upon its inner periphery with an annular rib having a face inclined toward the center of the wheel and an annular face at a right angle to the axial line of the tire and secured upon said center by shrinking, substantially as set forth.

9. The combination, with a car-wheel center formed upon its periphery with an annular rib or flange having its outer face at a right angle to the plane of the wheel and a face inclined toward the center, of a tire formed in and upon its inner periphery with a right-angled annular recess and a face inclined toward the center and secured upon said center by shrinking, substantially as set forth.

In testimony that I claim the foregoing to be my invention I have hereunto set my hand this 20th day of November, A. D. 1890.

WILLIAM H. SILVERTHORN.

Witnesses:
N. H. FAY,
WM. SECHER.